US012073617B1

United States Patent
Ayyalluseshagiri Viswanathan et al.

(10) Patent No.: US 12,073,617 B1
(45) Date of Patent: Aug. 27, 2024

(54) SYSTEM FOR ARBITRATION OF CONCURRENT APPLICATION ACCESS TO SINGLE SENSOR

(71) Applicant: AMAZON TECHNOLOGIES, INC., Seattle, WA (US)

(72) Inventors: Karthick Kumaran Ayyalluseshagiri Viswanathan, Mountain House, CA (US); Vidhyananth Ramasamy Venkatasamy, San Jose, CA (US); Somnath Mitra, Pleasanton, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 362 days.

(21) Appl. No.: 17/448,105

(22) Filed: Sep. 20, 2021

(51) Int. Cl.
| | |
|---|---|
| *G06K 9/00* | (2022.01) |
| *G05D 1/00* | (2006.01) |
| *G06V 20/20* | (2022.01) |
| *G06V 20/40* | (2022.01) |

(52) U.S. Cl.
CPC ........... *G06V 20/20* (2022.01); *G05D 1/0088* (2013.01); *G05D 1/0094* (2013.01); *G06V 20/40* (2022.01)

(58) Field of Classification Search
CPC ............................................. G05D 2201/0216
See application file for complete search history.

(56) References Cited

U.S. PATENT DOCUMENTS

| | | | | |
|---|---|---|---|---|
| 7,266,532 | B2 * | 9/2007 | Sutton | H04L 9/40 706/14 |
| 10,754,350 | B2 * | 8/2020 | Russell | G05D 1/0094 |
| 11,093,765 | B2 * | 8/2021 | Miller | G06V 20/58 |
| 2015/0202770 | A1 * | 7/2015 | Patron | G06Q 30/0265 901/50 |
| 2017/0326726 | A1 * | 11/2017 | Grotmol | B25J 9/1607 |
| 2018/0247353 | A1 * | 8/2018 | Al-Ali | A61B 5/0205 |
| 2019/0304212 | A1 * | 10/2019 | Bailey | G07C 5/0825 |

\* cited by examiner

*Primary Examiner* — Hadi Akhavannik
(74) *Attorney, Agent, or Firm* — Lindauer Law, PLLC

(57) ABSTRACT

A device, such as an autonomous mobile device (AMD), includes sensors such as a camera. Multiple applications executing on the device may concurrently use sensor data from a single shared sensor. For example, a first application may use image data to localize the AMD while a second application uses the image data to recognize users. The first application and the second application may have different parameters for operation of the sensor or resulting sensor data, such as different image resolutions and frame rates. An arbitrator system manages these different parameters, and may also provide sensor data to the respective application that is consistent with the application's parameters. For example, different resolutions of image data may be provided to different applications based on their parameters.

20 Claims, 7 Drawing Sheets

SYSTEM FOR ARBITRATION OF CONCURRENT APPLICATION ACCESS TO SINGLE SENSOR

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
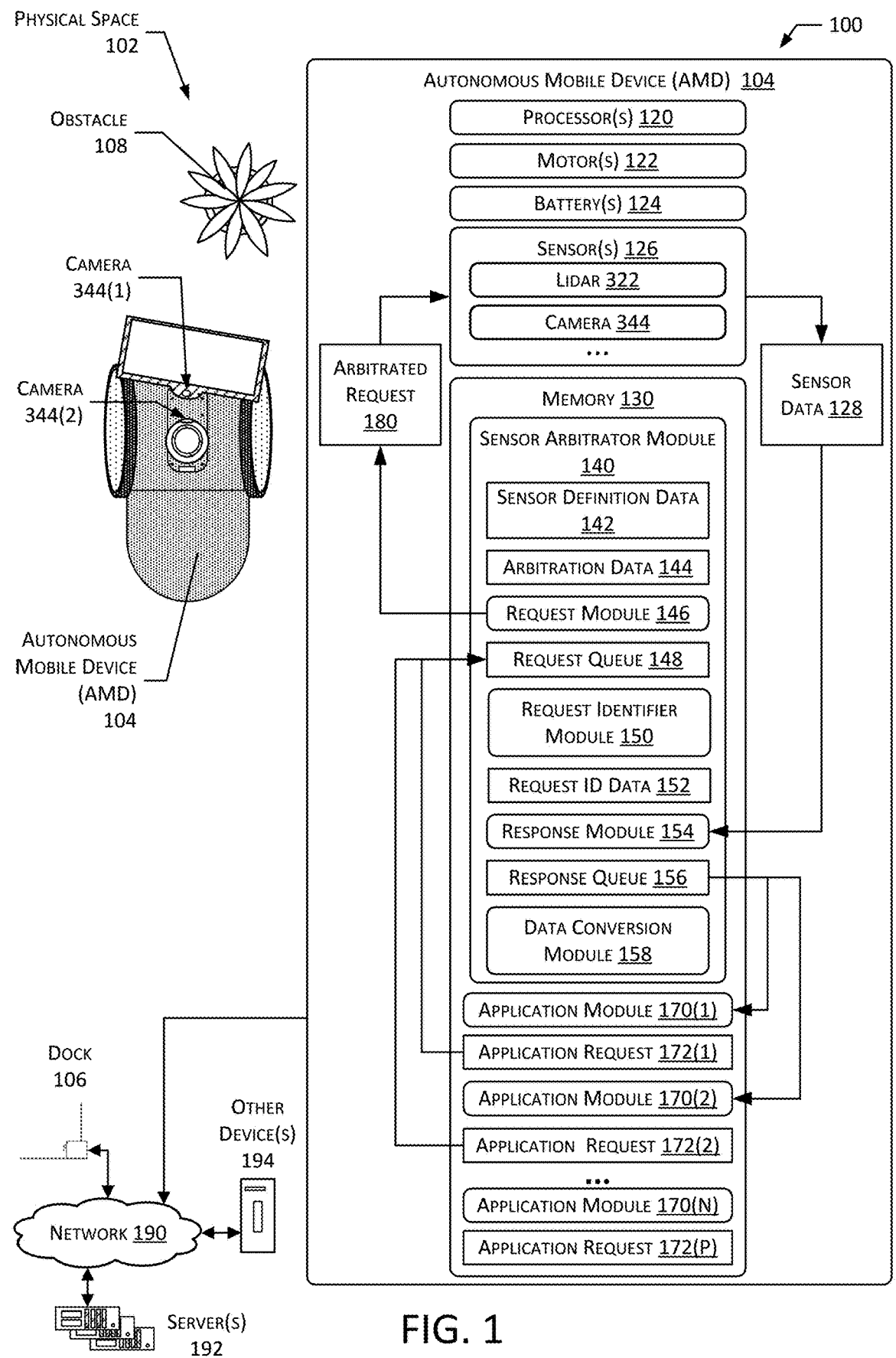
FIG. 1 illustrates a system for arbitration of concurrent application access to a single sensor of a device, such as an Autonomous Mobile Device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A device, such as an autonomous mobile device (AMD) may have one or more sensors used to acquire sensor data. This sensor data may be used in various ways. For example, the sensor data may be used to facilitate autonomous movement of the AMD from one location in a physical space to another location without being controlled by a user. A user may interact with the AMD and the AMD may perform tasks that involve moving in the physical space, displaying information, accepting input, and so forth. These tasks may use sensor data as well.

Different applications, such as those used for localizing the AMD in the physical space, gathering data to use to determine an occupancy map, to detect the presence of users, and so forth may use the sensor data during operation. Different applications may call for sensor data having different parameters. Parameters associated with output from a camera may include resolution, frame rate, and so forth. For example, a first application implementing a simultaneous localization and mapping (SLAM) algorithm that is used to localize the AMD may require image data from a camera with a resolution of 1920×1080 at a frame rate of 30 frames per second (FPS). Continuing the example, a second application implementing a visual perception algorithm to determine if a user is present may require image data with a resolution of 640×480 at 10 FPS. These two applications have different parameters for the image data they are requesting.

A traditional approach has been to use two separate cameras, each providing a stream of image data with the particular parameters required by a particular application. However, this adds complexity, increases the overall cost of the device, and so forth. For example, having two separate cameras each with a different point of view, may require additional processing to align the output from both to a common view.

Described in this disclosure are techniques and systems that allow a single sensor to provide concurrent access to a plurality of applications, while also providing for arbitration of the different parameters required by those applications. This arbitration allows different applications to exert control over the parameters used to operate a shared sensor, while maintaining usable sensor data for the participating applications.

A sensor arbitrator module uses sensor definition data to specify individual device identifiers (IDs) for each of a predetermined set of sensors that may include physical sensors and virtual sensors. A virtual sensor is associated with a particular physical sensor. A virtual sensor may have the same or different parameters as the physical sensor. In any event, the virtual sensor has parameters that are consistent with, or compatible with, the parameters of the physical sensor. For example, a virtual sensor may specify a frame rate that is evenly divisible with the frame rate of the underlying physical sensor.

Individual applications that are participating, may attach to the particular device ID. For example, a first application may attach to a first device ID while a second application attaches to a second device ID. The first device ID may be associated with a first physical sensor, while the second device ID may be a virtual sensor that is also associated with the same first physical sensor. Once attached, each application may operate as if it had exclusive access to the first physical sensor, with the sensor arbitrator module arbitrating actual requests made to the first physical sensor.

Arbitration data specifies which device ID, with respect to other device IDs, has priority for one or more parameters. This allows for flexible allocation of priority between the participating applications. For example, the first device ID may have priority over frame rate and resolution, while the second device ID may have priority over camera automatic exposure settings.

As requests are made from the participating applications, the sensor arbitrator module assesses the request with respect to the arbitration data. If contradictory requests are received, the sensor arbitrator module selects the request having the highest priority and disregards other requests. Requests may also be collated to reduce redundancy. Redundancy may be determined based on an association or commonality of parameters in a request. For example, if two applications are requesting the same resolution and same frame rate, those two requests from the respective applications may be combined into a single request that is sent to the first physical sensor. This request arbitration thus allows several different applications the possibility to concurrently control, as permitted by the priorities specified in the arbitration data, a single physical sensor.

The sensor arbitrator module may also maintain request identifier data, such as frame numbers. For example, the sensor arbitrator module may maintain a universal number that is used for all received requests and maintain information that associates individual application frame numbers to this universal number.

As sensor data is received from the physical sensor, the sensor arbitrator module provides the requested sensor data to the requesting applications. The request identifier data allows the resulting sensor data, such as a particular frame, to be associated with the application frame number. The requesting applications each receive their requested sensor data consistent with the parameters they are expecting.

In some implementations, the sensor arbitrator module may include or utilize one or more data conversion modules. For example, a data conversion module may convert sensor data from a first resolution to a second resolution.

The sensor arbitrator module may be implemented as a hardware abstraction layer (HAL) within an operating system between an existing framework and an existing sensor hardware abstraction layer (HAL). This allows the functionality described herein to be provided without modifying application programming interfaces (APIs) used by the applications or the sensor HAL. For example, applications may make existing API calls to their device ID and receive responses as expected. Likewise, the existing sensor HAL receives and responds to the arbitrated API calls made by the sensor arbitrator module.

By using the techniques and systems described in this disclosure, sensor data from a single sensor may be utilized concurrently by two or more applications. Requests by those applications are arbitrated before being passed to a sensor HAL, while responses are processed and distributed to the requesting two or more applications.

Illustrative System

FIG. 1 illustrates a system 100 for arbitration of concurrent application access to a single sensor of a device, such as an Autonomous Mobile Device (AMD) 104, according to some implementations. A physical space 102 includes a device, such as the autonomous mobile device (AMD) 104. The physical space 102 may be one or more floors within a residence, office, vessel, and so forth. The AMD 104 may be configured to dock or connect to a dock 106. The dock 106 may provide external power which the AMD 104 may use to charge a battery 124 of the AMD 104.

The physical space 102 may include various obstacles 108 such as walls, furniture, toys, ledges, stairs, and so forth that the AMD 104 is unable to physically traverse. For example, stairs may be an obstacle 108 to a relatively small AMD 104 that uses wheels for locomotion. In comparison, stairs may not be an obstacle 108 to an AMD 104 with legs for locomotion.

The AMD 104 may include one or more hardware processors 120 (processors) configured to execute one or more stored instructions. The processors 120 may comprise one or more cores. The processors 120 may include microcontrollers, systems on a chip, field programmable gate arrays, digital signal processors, image signal processors, graphic processing units, general processing units, and so forth.

One or more motors 122 or other actuators enable the AMD 104 to move from one location in the physical space 102 to another. For example, a motor 122 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include battery(s) 124 to provide electrical power for operation of the AMD 104. The battery 124 may be rechargeable, allowing it to store electrical energy obtained from an external source, such as the dock 106. In other implementations, a wireless power receiver may be used to provide power for operation of the AMD 104, recharge the battery 124, and so forth. Other aspects of the AMD 104 are discussed in more detail with regard to FIG. 2.

The AMD 104 may include one or more sensors 126. For example, the sensors 126 may include LIDAR 322, cameras 344, and so forth. The sensors 126 may generate sensor data 128. The sensors 126 are discussed in more detail with regard to FIG. 3.

The AMD 104 includes one or more memories 130. The memory 130 may comprise one or more non-transitory computer-readable storage media (CRSM). The memory 130 may store the sensor data 128 resulting from operation of the one or more sensors 126. The memory 130 may store one or more modules. These modules may execute, at least in part, on the one or more processors 120.

The sensor data 128 may be useful to different application modules 170 that are executing on the one or more processors 120. For example, image data from a camera 344 may be used by a SLAM module, a visual perception module, and so forth. A sensor arbitrator module 140 may be stored in the memory 130 and executed by the one or more processors 120 to provide concurrent access to two or more application modules 170.

The AMD 104 may execute a plurality of application modules 170(1), 170(2), . . . , 170(N). These different application modules 170 may provide different functionality. For example, a first application module 170(1) may implement a SLAM algorithm to determine localization data, while a second application module 170(2) implements a visual perception algorithm to determine if a user is present in an image. Other application modules 170 may implement other functionality, such as "find a specific user" or "sentry duty".

The sensor arbitrator module 140 may utilize sensor definition data 142 and arbitration data 144. The sensor definition data 142 associates particular physical sensors 126 with device identifiers (ID). The sensor definition data 142 may specify one or more virtual sensors. A virtual sensor is associated with a particular physical sensor 126. A virtual sensor may have the same or different parameters as the physical sensor 126. The virtual sensor has parameters that are consistent with, or compatible with, the parameters of the physical sensor 126. For example, a virtual sensor may specify a frame rate that is evenly divisible with the frame rate of the underlying physical sensor 126. For example, an evenly divisible result is one in which the quotient is an integer value.

The arbitration data 144 specifies the device IDs, parameters associated with each device ID, and sets forth the relative priority of the device ID with respect to the underlying physical sensor 126. For example, device ID "0" may have priority over frame rate and resolution for camera 344(1), while the device ID "2" has priority over camera automatic exposure settings.

The sensor arbitration module 140 may comprise a request module 146, request identifier module 150, and a response module 154. The request module 146 processes application requests 172(1), 172(2), . . . , 172(P) for sensor data 128. These application requests 172 may be stored in a request queue 148 for processing by the request module 146.

The application requests 172 are assessed by the request module 146 with respect to the sensor definition data 142 and the arbitration data 144. If application requests 172 are received that are contradictory with respect to the same physical sensor 126, the request module 146 uses the application request 172 having the highest priority and disregards other application requests 172 in the request queue 148 that are associated with the same physical sensor 126. The request module 146 sends the resulting arbitrated request 180 to operate the physical sensor 126. For example, the arbitrated request 180 may be sent to a hardware abstraction layer (HAL) associated with the camera 344. In some implementations, the request module 146 may implement rate control, sending arbitrated requests 180 at specified times. For example, the request module 146 may send a second arbitrated request 180(2) 1/30$^{th}$ of a second after a first arbitrated request 180(1) to provide sensor data 128 at a desired 30 frames per second. The timing at which arbitrated requests 180 are sent may be based on the requested frame rate or data rate specified by one or more of the sensor definition data 142, arbitration data 144, application module 170, and so forth.

From the point of view of the HAL associated with the physical sensor 126, such as the camera 344, the sensor arbitrator module 140 acts as a single device sending requests to that sensor 126. From the point of view of the application modules 170, each application is interacting with a different device ID, appearing to be a sensor 126.

In addition to using the arbitration data 144, the request module 146 may also collate application requests 172, to reduce redundancy. Redundancy may be determined based on an association of parameters in a request. For example, if two applications send application requests 172 for the same resolution and same frame rate, those two requests from the respective applications may be collated into a single arbitrated request 180 that is sent to the physical sensor 126. This request arbitration thus allows several different applications the possibility to concurrently control, as permitted by the priorities specified in the arbitration data 144, a single physical sensor 126.

The request identifier (ID) module 150 maintains request identifier data 152, such as frame numbers. For example, the request identifier (ID) module 150 may maintain a universal number that is used for all received requests, and maintains information that associates individual application frame numbers to this universal number.

As sensor data 128 is received from the physical sensor 126, the response module 154 determines the sensor data 128 and stores the responses in the response queue 156. For example, the sensor data 128 may be processed to determine first sensor data 128(1) responsive to the first application request 172(1), second sensor data 128(2) responsive to the second application request 172(2), and so forth.

In some implementations, the request ID data 152 is used to provide the application frame number in the response. The requesting applications may then access the data in the response queue 156, each receiving their requested sensor data 128 consistent with the parameters they are expecting. Continuing the example, assuming non-conflicting parameters, the response queue 156 may have a single frame of image data associated with two different application frame numbers. The data in the response queue 156 is then provided to the requesting application modules 170.

In some implementations, a data conversion module 158 may be used to convert sensor data 128 received from the physical sensor 126 to the converted sensor data 128 stored in the response queue 156. The data conversion modules 158 may include, but are not limited to, resampling, transcoding, and so forth. For example, a data conversion module 158 may resample sensor data 128 from a first resolution to a second resolution. In another example, the data conversion module 158 may transcode the sensor data 128 from a first format to a second format.

The data conversion module(s) 158 may utilize one or more features provided by a processor 120 that is executing at least a portion of the sensor arbitrator module 140. For example, the data conversion module 158 may utilize a hardware scaler, graphics processing unit, image signal processor, digital signal processor, and so forth, to determine the converted sensor data 128. For example, the physical sensor 126 may provide a single stream of data at a frame rate of 60 FPS and a resolution of 4000×3000. The sensor arbitrator module 140 may use software, hardware, or a combination thereof to produce additional streams of data, such as a second stream of data at 30 FPS and downsampled to a resolution of 1920×1080. The number of streams supported may be limited only by available processing resources.

Operation of the sensor arbitrator module 140 is discussed in more detail with regard to FIGS. 4-7.

The AMD 104 may use a network 190 to access one or more servers 192. The servers 192 may process data from the AMD 104. The servers 192 may send data to the AMD 104 that may be subsequently used to operate the AMD 104.

The AMD 104 may also communicate with other devices 194. The other devices 194 may include one or more devices that are within the physical space 102 such as a home or associated with operation of one or more devices in the physical space 102. For example, the other devices 194 may include a doorbell camera, a garage door opener, a refrigerator, washing machine, and so forth. In some implementations, the other devices 194 may include other AMDs 104, vehicles, and so forth.

Figure 2:
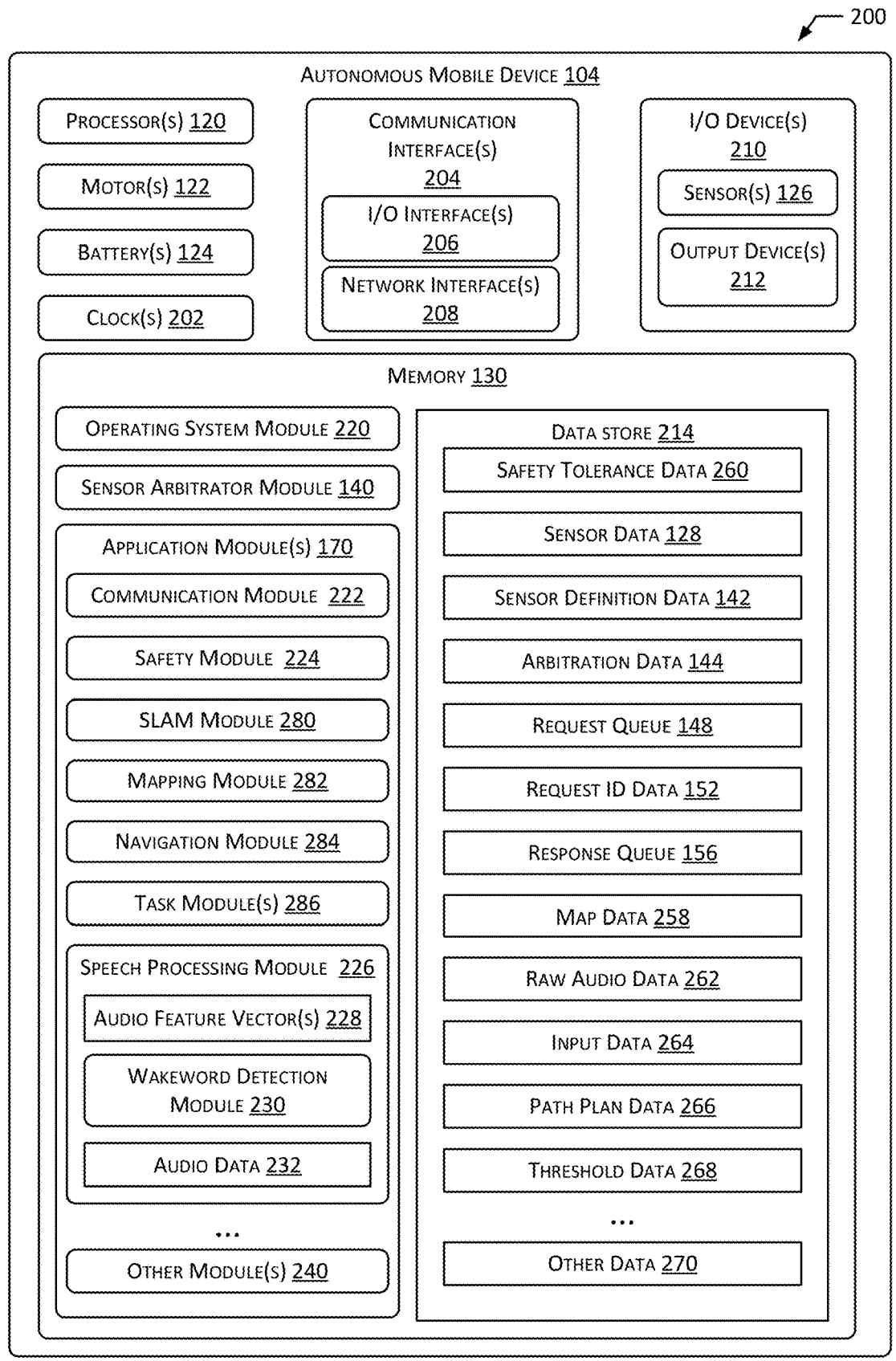
FIG. 2 is a block diagram of the components of the AMD, according to some implementations.

FIG. 2 is a block diagram 200 of the components of the AMD 104, according to some implementations.

As described, the AMD 104 may include one or more hardware processors 120 (processors) configured to execute one or more stored instructions. As described above, the AMD 104 may include one or more motors 122 or other actuators to enable the AMD 104 to move from one location in the physical space 102 to another.

The AMD 104 may include one or more batteries 124 to provide electrical power suitable for operating the components in the AMD 104. In some implementations, other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 120 may use data from the clock 202 to associate a particular time with an action, sensor data 128, and so forth. In some implementations, an exploration manager may determine plan data at a specified interval. For example, the exploration manager may determine plan data at one second intervals.

The AMD 104 may include one or more communication interfaces 204 such as input/output (I/O) interfaces 206, network interfaces 208, and so forth. The communication interfaces 204 enable the AMD 104, or components thereof, to communicate with other devices 194 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 126, keyboard, mouse, scanner, and so forth. The I/O devices 210 may also include output devices 212 such as one or more of a motor 122, light, speaker, display, projector, printer, and so forth. The output devices 212 are discussed in more detail with regard to FIG. 3. In some embodiments, the I/O devices 210 may be physically incorporated with the AMD 104 or may be externally placed.

The network interfaces 208 may be configured to provide communications between the AMD 104 and other devices 194 such as other AMDs 104, the dock 106, routers, access points, and so forth. The network interfaces 208 may include devices configured to couple to personal area networks (PANs), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104. The network interfaces 208 are discussed in more detail with regards to FIG. 3.

As shown in FIG. 2, the AMD 104 includes one or more memories 130. The memory 130 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 130 provides storage of computer-readable instructions, data structures, program modules, and other data for the operation of the AMD 104. Example functional modules are shown stored in the memory 130, although the same functionality may alternatively be implemented in hardware, firmware, or as a system on a chip (SoC).

The memory 130 may include at least one operating system (OS) module 220. The OS module 220 is configured to manage hardware resource devices such as the I/O interfaces 206, the I/O devices 210, the communication interfaces 204, and provide various services to applications or modules executing on the processors 120. The OS module 220 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

The sensor arbitrator module 140 may also be stored in the memory 130. In some implementations the sensor arbitrator module 140 may be included in the OS module 220. In other implementations, the sensor arbitrator module 140 may execute at least in part onboard one or more processors of the sensors 126. For example, an image signal processor (ISP) of a camera 344 may implement at least a portion of the functionality of the sensor arbitrator module 140. The sensor arbitrator module 140 may utilize the sensor definition data 142, arbitration data 144, manage the request queue 148, determine request ID data 152, manage the response queue 156, and so forth. Operation of the sensor arbitrator module 140 is discussed in more detail with regard to FIGS. 4-7.

Also stored in the memory 130 may be a data store 214 and one or more of the following modules. These modules may be executed as foreground applications, background tasks, daemons, and so forth. The data store 214 may use a flat file, database, linked list, tree, executable code, script, or other data structure to store information. In some implementations, the data store 214 or a portion of the data store 214 may be distributed across one or more other devices 194 including other AMDs 104, servers 192, network attached storage devices, and so forth.

A communication module 222 may be configured to establish communication with other devices 194, such as other AMDs 104, an external server 192, a dock 106, and so forth. The communications may be authenticated, encrypted, and so forth.

Other modules within the memory 130 may include a safety module 224, a SLAM module(s) 280, a mapping module 282, a navigation module 284, task modules 286, a speech processing module 226, or other modules 240. The modules may access data stored within the data store 214, including safety tolerance data 260, sensor data 128, map data 258, other data 270, and so forth.

The safety module 224 may access the safety tolerance data 260 to determine within what tolerances the AMD 104 may operate safely within the physical space 102. For example, the safety module 224 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

The AMD 104 may include one or more simultaneous localization and mapping (SLAM) modules 280 used to determine localization data. Localization data is information that is indicative of a location of the AMD 104 in the physical space 102 at a particular time and may include orientation. For example, the sensors 126 may include cameras 344 that acquire images of the physical space 102. These images are processed to determine feature data representative of the presence of features in the images, such as edges of doors, shadows on the wall, texture on the walls, and so forth.

The localization data may be based on one or more of internal references or external references. Internal references may comprise wheel encoder output, odometry, integration of inertial measurements from one or more inertial measurement units (IMU), instructions issued to a motor controller, and so forth.

External references may comprise features present in the physical space 102 or obtained from a source that is outside of the AMD 104. For example, external references may comprise features in the physical space 102 that are visible to cameras 344 on the AMD 104, signals received from a positioning system, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

A feature is detectable by a sensor 126 and is represented in the sensor data 128. For example, a feature within an image may comprise a shadow, an edge of a door frame depicted in the image, and so forth. The sensor data 128 may be stored as, or used to determine, feature data as described below. A pose is indicative of a location and orientation within the physical space 102.

During operation, the SLAM module 280 may determine information such as keyframe data and a view score associated with the keyframe data. The keyframe data may be associated with a particular pose and may comprise one or more keyframes. A keyframe may comprise an image acquired by a camera 344 of the AMD 104 while the AMD 104 or portion thereof is at a particular pose. In another example, the keyframe may comprise descriptors associated with one or more features determined from an image acquired by a camera 344 while at a particular pose.

The view score is a metric that is indicative of the features in a given keyframe. For example, the view score may comprise or be based on data indicative of a count of features that are associated with pose data, density of features associated with the pose data, and so forth. A keyframe that is associated with a greater view score may have a greater likelihood of producing localization data at a later time.

As the AMD 104 moves in the physical space 102, the SLAM module 280 may provide as output the localization data that may be used to determine a pose graph or other information. Each pose in the pose graph may be based, at least in part, on the apparent motion of observed features in the images. For example, from image to image at least some of the features that are described by descriptors will be in common. By determining the relative difference in apparent position in the image of the same feature as observed by two different cameras 344 at the same time, the location of the camera 344 with respect to the feature in the physical space 102 may be determined. At successive times, and as the AMD 104 moves and additional images are determined from locations in the physical space 102, the apparent change in position of the same feature across the additional images may be used to determine subsequent poses.

While the AMD 104 is operating, the sensors 126 may determine sensor data 128 comprising information about the physical space 102. The mapping module 282 uses the localization data and the sensor data 128 from various sensors 126 to determine information such as where the AMD 104 is, the presence of obstacles 108, where those obstacles 108 are, and so forth. For example, the sensors 126 may comprise a time-of-flight (TOF) depth camera, ultrasound, radar, and so forth. Depth data from these sensors 126 may be indicative of whether an obstacle 108 is detected or not and includes information about the distance between the sensor 126 and the obstacle 108 and a relative direction, with respect to the sensor 126, of a detected obstacle 108. Given accurate localization data, the mapping module 282 is able to relate a relative location of an obstacle 108 to a specified origin or reference pose and determine map data 258.

The map data 258 may comprise one or more of feature data, occupancy map data, or other data. The feature data comprises information about the features detected by the sensor data 128. For example, the feature data may comprise keyframes that are generated by the SLAM module 280 based on sensor data 128.

The occupancy map data represents the physical space 102 and obstacles 108 therein. For example, the occupancy map data may be represented as a map showing the location and boundaries of the obstacles 108.

The mapping module 282 may maintain the map data 258 that associates the feature data with respect to the occupancy map data. For example, a pose associated with particular feature data indicative of features visible from the pose may be associated with particular coordinates and orientation with respect to the occupancy map data.

The physical space 102 may be represented by map data 258 that may comprise a plurality of individual maps. The maps may comprise feature data, occupancy map data, and so forth. For example, each floor of a building may be expressed as different feature data and occupancy map data.

The navigation module 284 provides the AMD 104 with the ability to navigate within the physical space 102 without real-time human interaction. The navigation module 284 may implement, or operate in conjunction with, the mapping module 282 to determine the map data 258 or other representation of the physical space 102.

The navigation module 284 may use the map data 258 to determine a set of possible paths along which the AMD 104 may move. One of these may be selected and used to determine path plan data 266 indicative of a path. The path is then subsequently used to determine a set of commands that drive the motors 122 connected to the wheels.

The AMD 104 may utilize one or more task modules 286. The task module 286 comprises instructions that, when executed, provide one or more functions. The task modules 286 may perform functions such as finding a user, following a user, presenting output on output devices 212 of the AMD 104, performing sentry tasks by moving the AMD 104 through the physical space 102 to determine the presence of unauthorized people, and so forth. Tasks may be indicated by task data, and the task data may be stored in a queue or some other memory structure within the memory 130.

The speech processing module 226 may be used to process utterances of the user. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 228 that may ultimately be used for processing by various components, such as a wakeword detection module 230, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 190 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 228) representing features/qualities of the raw audio data 262 within each frame. A frame may be a certain period of time, for example a sliding window of 25 ms of audio data 232 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 228 (or the raw audio data 262) may be input into a wakeword detection module 230 that is configured to detect keywords spoken in the audio. The wakeword detection module 230 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 230 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 230 may compare audio data 232 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 232 (which may include one or more of the raw audio data 262 or the audio feature vectors 228) to one or more server(s) 192 for speech processing. The audio data 232 corresponding to audio obtained by the microphone may be processed locally on one or more of the processors 120, sent to a server 192 for routing to a recipient device, or may be sent to the server 192 for speech processing for interpretation of the included speech (either for purposes of enabling voice-communications and/or for purposes of executing a command in the speech). The audio data 232 may include data corresponding to the wakeword, or the portion of the audio data 232 corresponding to the wakeword may be removed by the AMD 104 before processing by the navigation module 284, before sending to the server 192, and so forth.

The speech processing module 226 may include or access an automated speech recognition (ASR) module. The ASR module may accept as input raw audio data 262, audio feature vectors 228, or other sensor data 128, and so forth and may produce as output input data 264 comprising a text string or other data representation. The input data 264 comprising the text string or other data representation may be processed to determine the command to be executed. For example, the utterance of the command "robot, come here" may result in input data 264 comprising the text string "come here". The wakeword "robot" may be omitted from the input data 264. The input data 264 may then be provided to the navigation module 284.

Modules described herein, such as the SLAM module 280, mapping module 282, and so forth may provide various processing functions such as de-noising, filtering, and so forth. Processing of sensor data 128, such as image data from a camera 344, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 128. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 128 or other data. For example, the ANN may be trained using a supervised learning algorithm such that object identifiers are associated with images of particular objects within training images provided to the ANN. Once trained, the ANN may be provided with the sensor data 128 and produce output indicative of the object identifier.

The AMD 104 may be operated responsive to a non-user initiated determination made by an onboard processor 120, in response to a command received from one or more communication interfaces 204, as determined from the sensor data 128, and so forth. For example, an external server 192 may send a command that is received using the network interface 208. This command may direct the AMD 104 to proceed to find a particular user, follow a particular user, and so forth. The AMD 104 may then process this command and use the navigation module 284 to determine the directions and distances associated with carrying out the command. For example, the command to "come here" may result in the task module 286 sending a command to the navigation module 284 to move the AMD 104 to a particular location near the user and orient the AMD 104 in a particular direction.

The AMD 104 may connect to the network 190 using one or more of the network interfaces 208. In some implementations, one or more of the modules or other functions described here may execute on the processors 120 of the AMD 104, on the server 192, or a combination thereof. For example, one or more servers 192 may provide various functions, such as ASR, natural language understanding (NLU), providing content such as audio or video to the AMD 104, and so forth.

The other modules 240 may provide other functionality, such as object recognition, speech synthesis, user identification, and so forth. The other modules 240 may comprise a speech synthesis module that is able to convert text data to human speech. For example, the speech synthesis module may be used by the AMD 104 to provide speech that a user is able to understand.

The data store 214 may store the other data 270 as well. For example, localization settings may indicate local preferences such as language, user identifier data may be stored that allows for identification of a particular user, and so forth. The data store 214 may also store values for various thresholds as threshold data 268.

Figure 3:
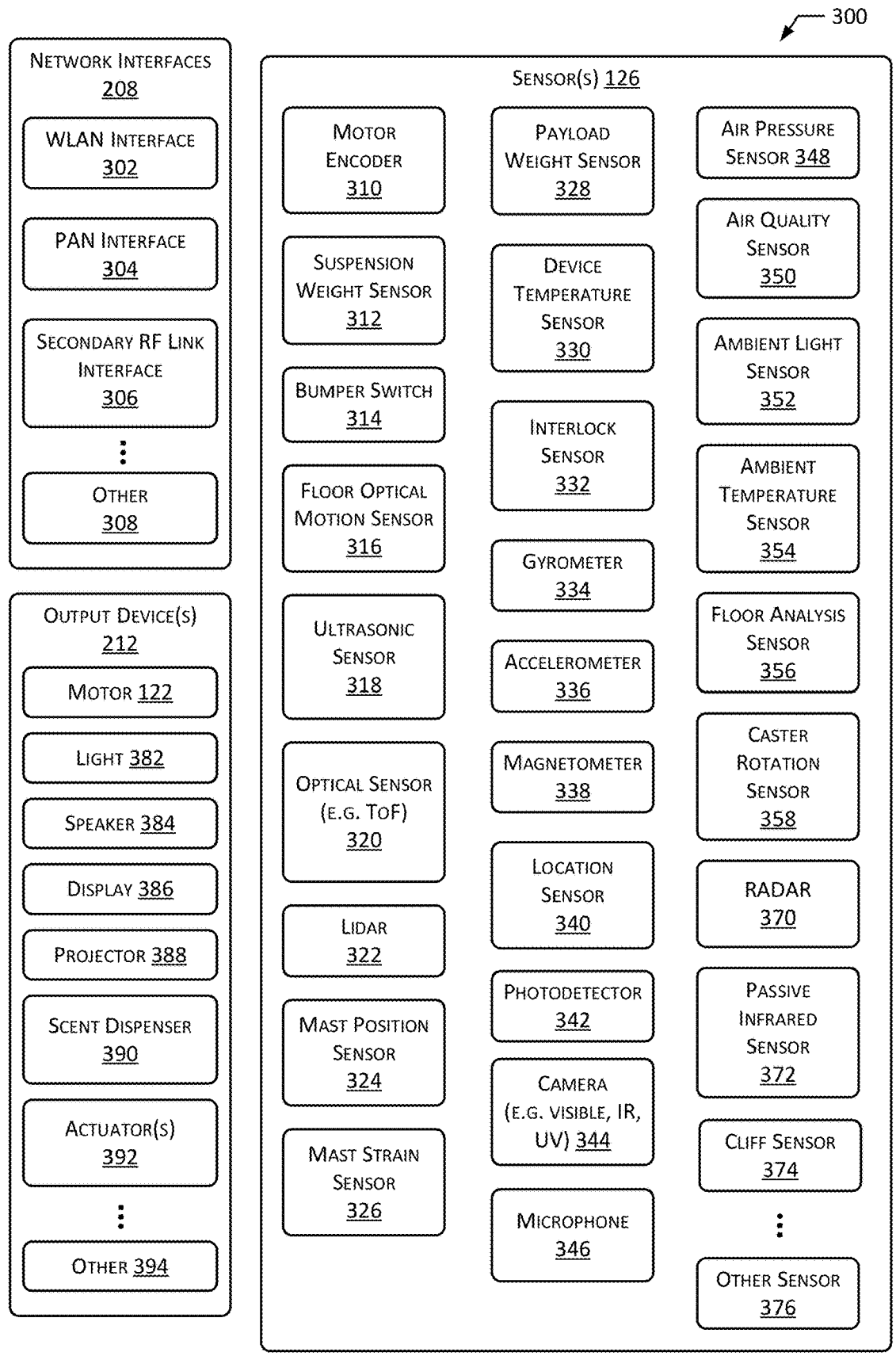
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 208, output devices 212, or sensors 126 depicted here, or may utilize components not pictured. One or more of the sensors 126, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHZ and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHZ ISM band, within a licensed band at another frequency, and so forth. The secondary RF link interface 306 may be utilized to provide backup communication between the AMD 104 and other devices 194 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, dock 106, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 126. The sensors 126 depicted here are provided by way of illustration and not necessarily as a limitation. It is understood that other sensors 126 may be included or utilized by the AMD 104, while some sensors 126 may be omitted in some configurations.

A motor encoder 310 provides information indicative of the rotation or linear extension of a motor 122. The motor 122 may comprise a rotary motor, or a linear actuator. In some implementations, the motor encoder 310 may comprise a separate assembly such as a photodiode and encoder wheel that is affixed to the motor 122. In other implementations, the motor encoder 310 may comprise circuitry configured to drive the motor 122. For example, the navigation module 284 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 224 may use data from the suspension weight sensor 312 to determine whether or not to inhibit operation of one or more of the motors 122. For example, if the suspension weight sensor 312 indicates no weight on the suspension, the implication is that the AMD 104 is no longer resting on its wheels, and thus operation of the motors 122 may be inhibited. In another example, if the suspension weight sensor 312 indicates weight that exceeds a threshold value, the implication is that something heavy is resting on the AMD 104 and thus operation of the motors 122 may be inhibited. For example, the threshold value may comprise a weight of a load that compresses a suspension system to a minimum height, or results in a mass that exceeds a torque output of the motors 122 to maintain a minimum acceleration.

One or more bumper switches 314 provide an indication of physical contact between a bumper or other member that is in mechanical contact with the bumper switch 314. The safety module 224 utilizes sensor data 128 obtained by the bumper switches 314 to modify the operation of the AMD 104. For example, if the bumper switch 314 associated with a front of the AMD 104 is triggered, the safety module 224 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 126 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 128 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 126 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 224 and the navigation module 284 may utilize the sensor data 128 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 128 may be generated that is indicative of the presence of objects and the relative positions, shapes, and so forth that are visible to the lidar 322. Data from the lidar 322 may be used by various modules. For example, the navigation module 284 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 224. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 224 may utilize sensor data 128 obtained by the mast strain sensor 326. For example, if the strain applied to the mast exceeds a threshold amount, the safety module 224 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 224 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 124, one or more motors 122, and so forth. In the event the temperature exceeds a threshold value, the component associated with that device temperature sensor 330 may be shut down. For example, the threshold value may be determined based on component specifications, such as a maximum permissible temperature of the batteries 124.

One or more interlock sensors 332 may provide data to the safety module 224 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyrometer 334 may provide information indicative of rotation of an object affixed thereto. For example, a gyrometer 334 may generate sensor data 128 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyrometer 334 in the accelerometer 336 may comprise a prepackaged solid-state inertial measurement unit (IMU) that provides multiple axis gyrometers 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 128 indicative of impinging light. For example, the photodetector 342 may provide data indicative of a color, intensity, duration, and so forth.

A camera 344 generates sensor data 128 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 128 comprising images being sent to the navigation module 284. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the navigation module 284 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 224, the navigation module 284, the task module 286, and so forth. For example, if the floor analysis sensor 356 determines that the floor is wet, the safety module 224 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 126 may include a radar 370. The radar 370 may be used to provide information as to a distance, lateral position, and so forth, to an object.

The sensors 126 may include a passive infrared (PIR) sensor 372. The PIR sensor 372 may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, the cliff sensors 374 may be time-of-flight sensors that have a field of view directed downward toward a floor over which the AMD 104 is moving.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 102 to provide landmarks for the navigation module 284. One or more touch sensors may be utilized to determine contact with a user or other objects.

The AMD 104 may include one or more output devices 212. A motor 122 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 122 with an eccentric weight may be used to create a buzz or vibration to allow the AMD 104 to simulate the purr of a cat.

Figure 4:
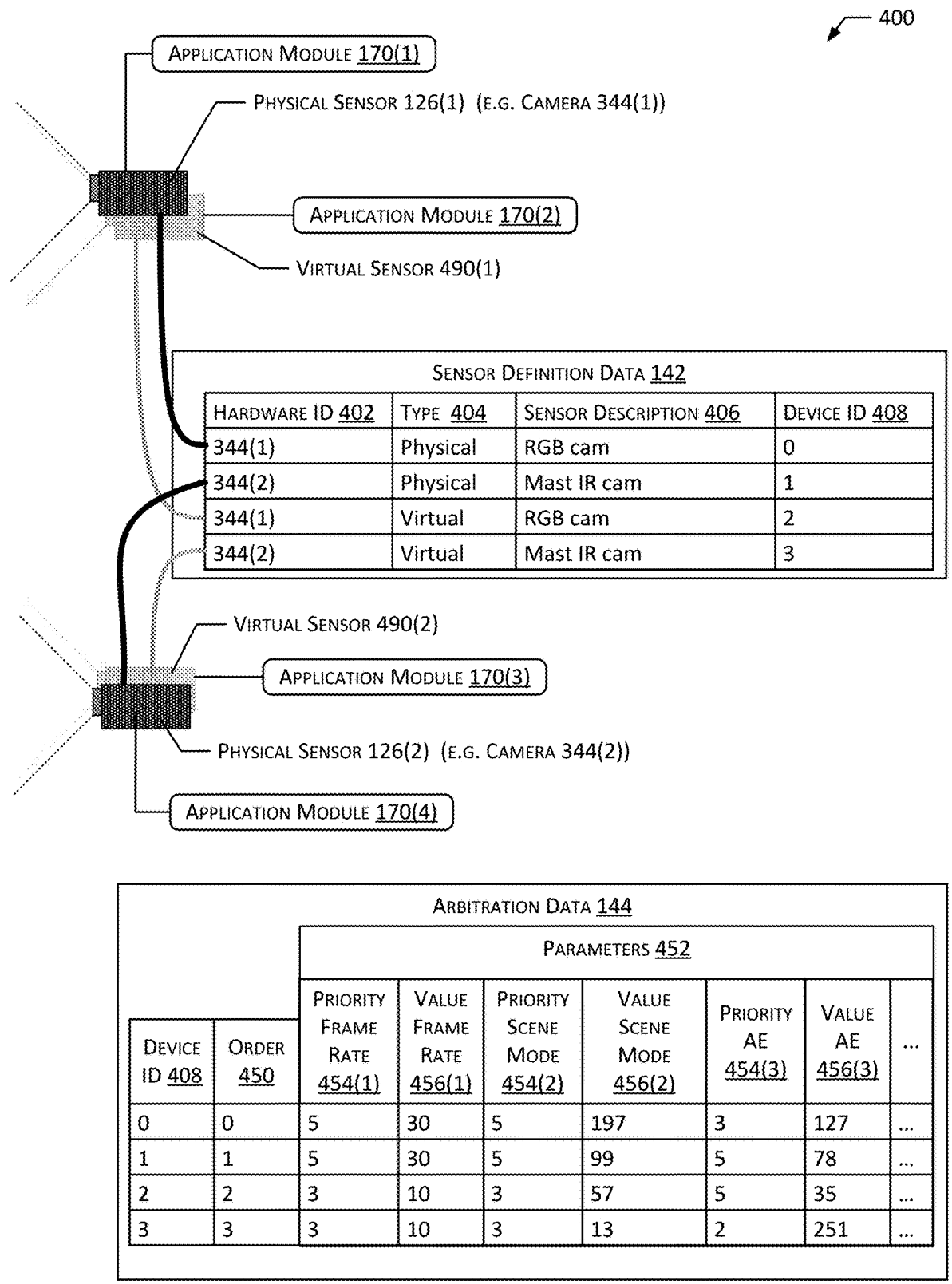
FIG. 4 illustrates sensor definition data and arbitration data that may be used to arbitrate concurrent application access to a single sensor of a device, according to some implementations.

FIG. 4 illustrates at 400 sensor definition data 142 and arbitration data 144 that may be used to arbitrate concurrent application access to a single sensor 126 of a device, according to some implementations. The data in this disclosure is depicted as tables for ease of illustration, and not necessarily as a limitation. Other data structures may be used, including but not limited to: flat files, linked lists, executable code, JavaScript Object Notation (JSON), extensible markup language (XML), and so forth.

The sensor definition data 142 associates a hardware identifier (ID) 402 with a device identifier (ID) 408. The hardware ID 402 is indicative of a particular physical sensor 126. For example, each camera 344, lidar 322, and so forth is associated with a single hardware ID 402 that is unique at least for that particular device.

The association of the sensor definition data 142 permits a many-to-one relationship. For example, the same hardware ID 402, such as camera 344(1) may be associated with two or more device IDs 408 such as "0" and "2". Continuing the example, the hardware ID 402 of 344(2) is associated with device IDs "1" and "3". The sensor definition data 142 thus provides a mapping between the device ID 408 and a particular sensor 126.

In this illustration, each sensor 126 has a corresponding virtual sensor 490. By using the sensor arbitrator module 140, the sensor 126 and a counterpart virtual sensor 490 provides sensor data 128 to respective application modules 170.

The sensor definition data 142 may comprise other information. For example, a type 404 may specify whether the particular device ID 408 is a "physical" or "virtual" sensor 126. A sensor description 406 may provide other information about the sensor 126 of that device ID 408. The sensor definition data 142 may be used to provide a pre-determined or static listing of physical sensors 126 and their virtual counterparts as specified.

The arbitration data 144 associates each device ID 408 with one or more parameters 452. The parameters 452 may specify a priority 454 associated with a particular attribute of operation of the sensor 126. The parameters 452 may specify a value 456 associated with operation of the sensor 126. For example, the priority 454(1) may specify a priority of "5" for frame rate of a particular device ID 408, while the value 456(1) specifies "30" FPS.

The arbitration data 144 may include a plurality of parameters 452 and values 454 for each device ID 408. In this illustration, the arbitration data 144 lists the four device IDs 408(0)-(3) as indicated by the sensor definition data 142. Each of the device IDs 408 specifies a priority of frame rate 454(1), value of frame rate 456(1), priority of scene mode 454(2), value of scene mode 456(2), priority of auto exposure 454(3), value of auto exposure 456(3), and so on. The frame rate may specify a frequency at which image data will be generated by the sensor 126. The resolution or frame resolution may specify the size of the image data, such as horizontal pixels×vertical pixels.

In other implementations, other parameters 452 may be specified. For example, the parameters 452 may include, but are not limited to: sample frequency, sample bit depth, color gamut, camera automatic exposure compensation, camera automatic exposure mode, camera control mode, camera scene mode, camera exposure time, camera sensitivity, lidar pulse rate, lidar spot size, and so forth.

In this illustration, device ID 408 "0" is associated with the camera 344(1), as is device ID 408 "2". As the request module 146 arbitrates incoming application requests 172, those associated with device ID 408 "0" that involve setting frame rate will be used in the arbitrated request 180, while application requests 172 associated with device ID 408 "2" that attempts to set frame rate will not. However, an application request 172 to device ID 408 "2" that changes the auto exposure setting will override an application request 172 from device ID 408 "0". As a result, different granularities of control may be supported and arbitrated by the request module 146.

The arbitration data 144 may be specified such that incompatible parameters 452 with respect to the same hardware ID 402 are prevented. For example, the arbitration data 144 may be constrained such that, with respect to a single hardware ID 402, only one device ID 408 is permitted to have a highest priority 454 for a particular value 456.

The arbitration data 144 may also associates each device ID 408 with a predetermined order 450 value. In some implementations the predetermined order 450 may be used as a tiebreaker between otherwise equal priorities as specified within the parameters 452.

Figure 5:
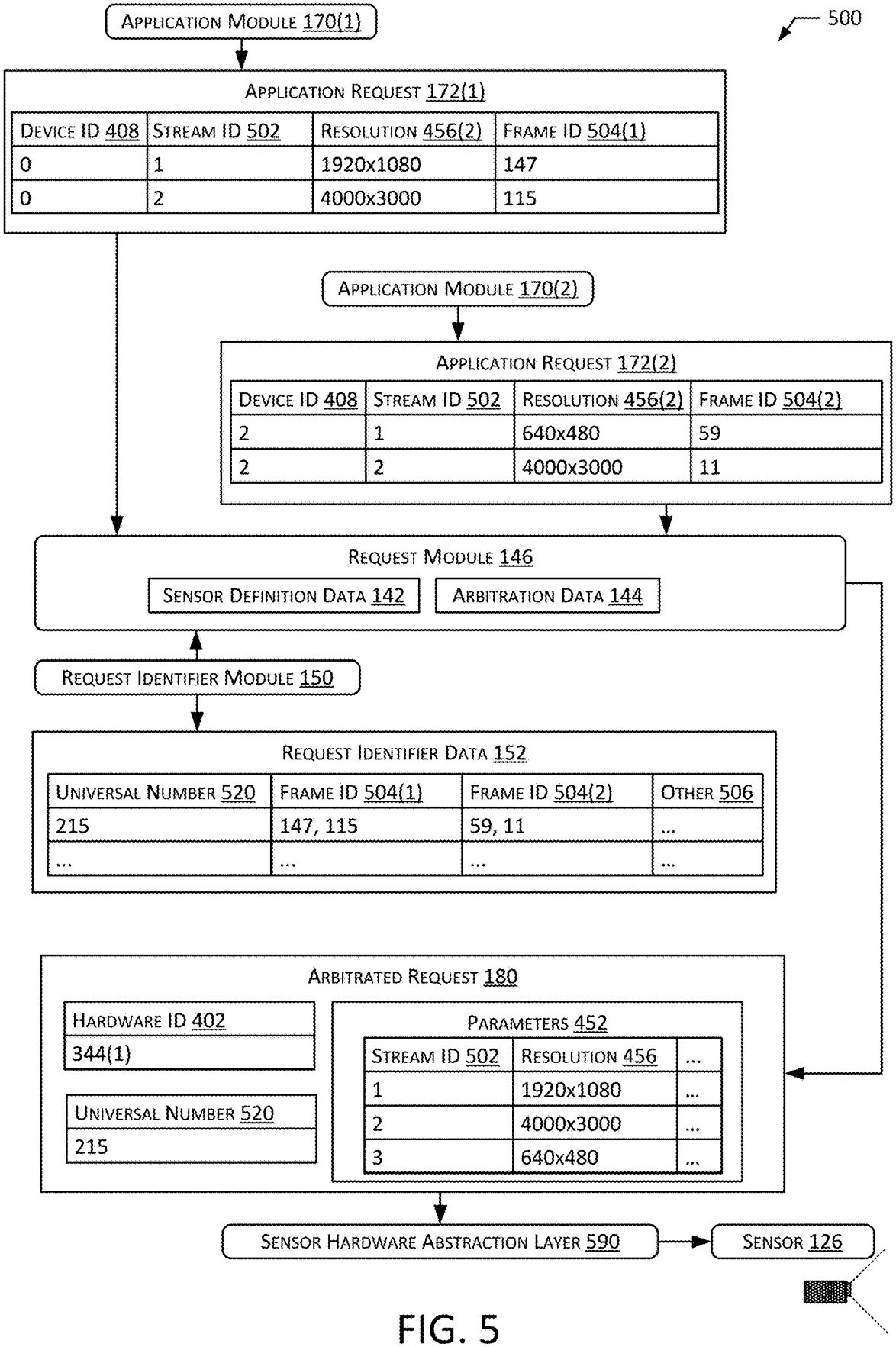
FIG. 5 illustrates two applications that are provided with access to a single sensor, according to one implementation.

FIG. 5 illustrates at 500 two application modules 170 that are provided with access to a single sensor 126, according to one implementation. Two application modules 170 are shown for ease of illustration. In some implementations, a single application module 170 may be operating, two application modules 170 may be operating, or more than two application modules 170 may be operating.

A first application module 170(1) sends a first application request 172(1) to the sensor arbitrator module 140. The first application request 172(1) may be stored in the request queue 148 for processing by the request module 146. For this illustration, the physical sensor 126 may comprise a camera 344 that is capable of providing up to three streams of image data. Each stream comprises a series of frames of image data. The streams may have different values 456 of parameters 452, such as different resolutions.

In this illustration, the first application request 172(1) specifies device ID 408 "O" to provide two streams: a first stream associated with a stream ID 502 of "1" has a resolution 456(2) of 1920×1080 with an application frame identifier (ID) 504(1) of "147". A second stream associated with a stream ID 502 of "2" has a resolution 456(2) of 4000×3000 and a frame ID 504(1) of "115".

A second application module 170(2) sends a second application request 172(2) to the sensor arbitrator module 140. The second application request 172(2) may be stored in the request queue 148 for processing by the request module 146.

In this illustration, the second application request 172(2) specifies device ID 408 "2" to also provide two streams: a first stream associated with a stream ID 502 of "1" has a resolution 456(2) of 640×480 with an application frame ID 504(2) of "59". A second stream associated with a stream ID 502 of "2" has a resolution 456(2) of 4000×3000 and an application frame ID 504(2) of "11".

These application requests 172 may be stored in the request queue 148 and further processed. The response module 154 uses the arbitration data 144 to determine which of the application requests 172(1) or 172(2) has priority. Continuing the example as set forth in FIG. 4, in this illustration the first application request 172(1) associated with the device ID 408 "0" has priority with respect to resolution 456(2) compared to the second application request 172(2) that is associated with the device ID 408 "2".

The request module 146 is also able to consolidate or collate application requests 172 to determine the arbitrated request 180. In this illustration, the application requests 172 call for four streams. However, as mentioned earlier with regard to this illustration, the camera 344 may only be able to support three streams. If one or more of the requested streams are deemed to be compatible, they may be collated and result in an arbitrated request 180 that is able to satisfy the requesting application modules 170.

The request module 146 determines that some of the requested streams in the application requests 172 have compatible parameters 452. Parameters 452 may be deemed to be compatible if one or more conditions are satisfied: they have values 456 that are equal, they have values 456 that are evenly divisible with respect to the value 456 with the highest priority, or the values 456 do not adversely affect operation of the application module 170 making the request. For example, an evenly divisible result is one in which the quotient is an integer value.

Referring to FIG. 4, device ID 408 "0" has a priority for frame rate 454(1) of "5" and a value 456(1) of "30" FPS, while device ID 408 "2" has a priority of "3" and a value of "10" FPS. Both device IDs "0" and "2" refer to the same physical sensor 126 with hardware ID 402 "344(1)". This scenario results in a compatible request, as 30 FPS is evenly divisible by 10 FPS. As a result, the sensor arbitrator module 140 is able to accommodate the second application request 172(2) by skipping to select every third frame and provide this sensor data 128 to the second application module 170(2). As a result, the request module 146 collates the requests for the common resolution of 4000×3000 into the arbitrated request 180.

The request module 146 operates in conjunction with the request identifier module 150 to maintain information that associates the frame IDs 504(1) of the incoming application requests 172 to a universal number 520 that is associated with an arbitrated request 180. In one implementation, the universal number 520 may comprise a frame number that monotonically increases.

In this illustration, the request ID data 152 associates the universal number 520 of "215" with the frame ID 504(1)-(2) and the streams therein. In other implementations, the request identifier data 152 may include other 506 information.

The response module 154 determines the arbitrated request 180. In this illustration, the arbitrated request 180 comprises the hardware ID 402 "344(1)", the universal number 520 "215", and the one or more arbitrated parameters 452 as determined by the response module 154. Continuing the earlier example, the parameters 452 specify the three streams with the specified resolutions 456, auto exposure (not shown), and so forth that are used to operate the sensor 126.

The arbitrated request 180 may be provided to a sensor hardware abstraction layer (HAL) 590. Based on the arbitrated request 180, the sensor HAL 590 operates the sensor 126. In one implementation associated with the Android operating system, the sensor HAL 590 may comprise a camera HAL. The arbitrated request 180 may be compliant with the "Camera Device HAL 3.6" application programming interface (API) specification as promulgated by "The Android Open Source Project".

During operation of the system, the different application modules 170 that are using sensor data 128 originating with the same physical sensor 126 may have different timing requirements. The frequency of application requests 172 may differ, such as due to different frame rates, while the time at which those application requests 172 are sent may vary due to use of different clocks 202, timing methodologies, and so forth.

The request module 146 may manage timing of when arbitrated requests 180 are sent to the sensor HAL 590. For example, the request module 146 may send arbitrated requests 180 that are associated with the 30 FPS sensor data 128 every $\frac{1}{30}^{th}$ of a second, while sending arbitrated requests 180 that are associated with the 10 FPS sensor data 128 every $\frac{1}{10}^{th}$ of a second. As described above, these arbitrated requests 180 may be collated. For example, the first arbitrated request 180(1) requesting three streams may be sent at time $\frac{1}{30}$, while a second arbitrated request 180(2) for a frame of the 30 FPS stream (not shown) is sent at time $\frac{2}{30}$, a third arbitrated request 180(3) for another frame of the 30 FPS stream (not shown) is sent at time $\frac{3}{30}$, and so forth. As discussed, the resulting responses may be used to provide the 30 FPS sensor data 128 and the 10 FPS sensor data 128.

In some implementations, timing of determining the arbitrated requests 180 may be maintained even if one of the participating application modules 170 does not send a request to the request module 146. For example, suppose the first application module 170(1) that is associated with a sensor data 128 at a first rate, such as 30 FPS, fails to provide the first application request 172(1). The second application module 170(2) in due course sends the second application request 172(2) for sensor data 128. The second application request 172(2) would be sent to the sensor HAL 590.

The request module 146 may implement an arbitration time window that specifies a time interval. The time interval may be based on one or more of the sensor definition data 142, arbitration data 144, application modules 170, and so forth.

Application requests 172 received during the time interval are arbitrated as described herein and used to determine the arbitrated request 180. The time interval may be based on one or more of the parameters 452, such as frame rate 456(1). In one implementation, the time interval may be a reciprocal of the greatest sensor sample frequency in use. For example, if the greatest frame rate associated with a participating application module 170 is 30 FPS, the time interval may be less than or equal to $\frac{1}{30}^{th}$ of a second. When the time interval expires, the arbitrated request 180 may be determined and sent to the sensor HAL 590. After sending an arbitrated request 180, the time interval may be restarted.

Other parameters 452 may also be included in the arbitrated request 180. Also referring to FIG. 4, device ID 408 "0" has a priority AE 454(3) of "3" and a value 456(3) of "127", while device ID 408 "2" has a priority of "5" and a value of "35". Both device IDs "0" and "2" refer to the same physical sensor 126 with hardware ID 402 "344(1)".

This scenario results in a compatible request, as the second application request 172(2) is permitted to specify the auto exposure of the camera 344, and may do so without adversely affecting operation of the first application module 170(1). As a result, the sensor arbitrator module 140 is able to accommodate the parameters 452 of the second application request 172(2).

Figure 6:
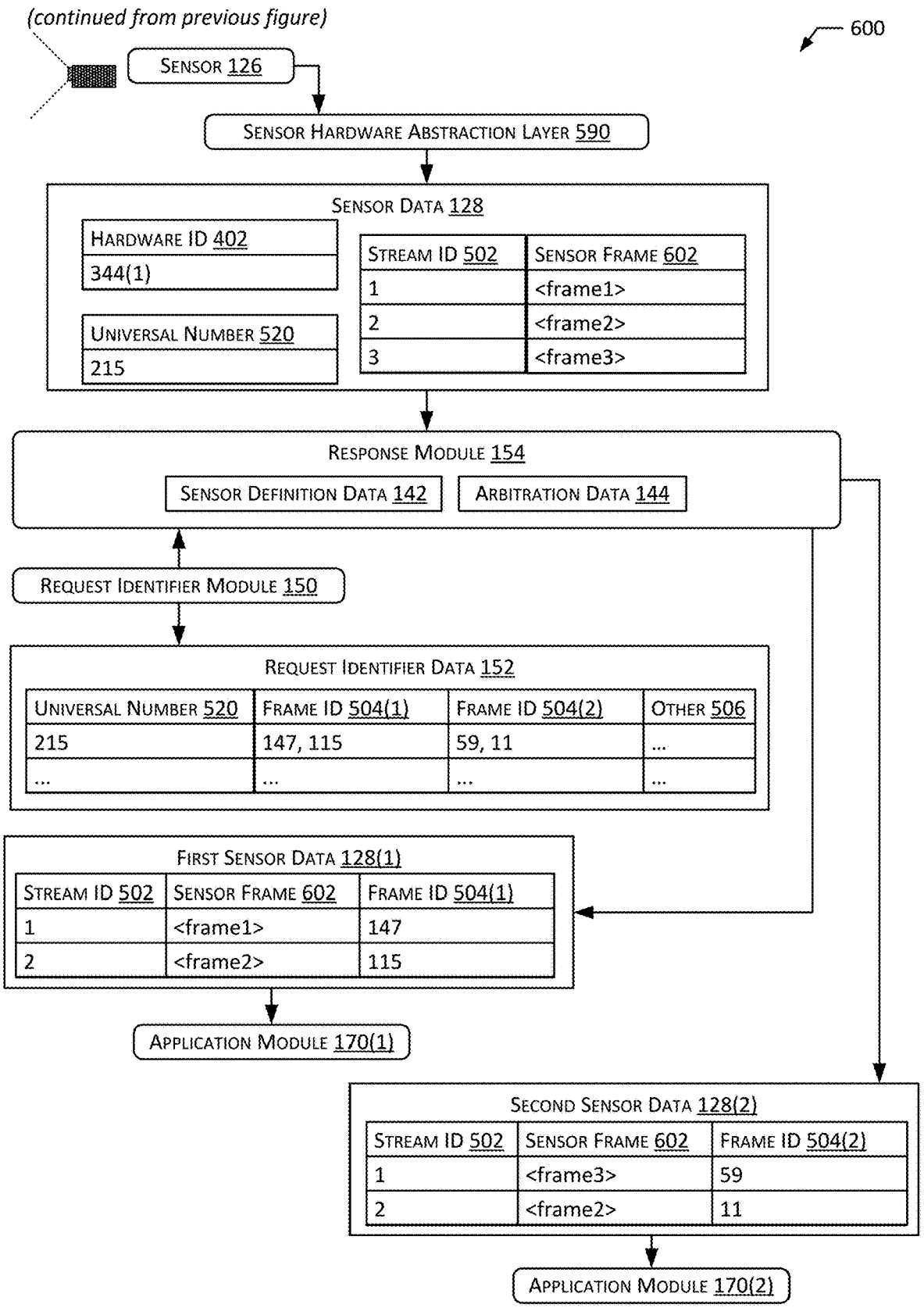
FIG. 6 illustrates sensor data being provided to the two applications of FIG. 5, according to one implementation.

FIG. 6 illustrates at 600 the sensor data 128 being provided to the two application modules 170 of FIG. 5, according to one implementation. Two application modules 170 are shown for ease of illustration. In some implementations, a single application module 170 may be operating, two application modules 170 may be operating, or more than two application modules 170 may be operating.

Responsive to the previously sent arbitrated request 180 the sensor 126 determines sensor data 128. In this illustration, the sensor 126 provides the sensor data 128 to the sensor HAL 590, that in turn responds with the sensor data 128. As described above, the request module 146 may implement rate control, managing the timing of the arbitrated requests 180 that are sent to the sensor HAL 590, such that the sensor data 128 results at desired times.

The sensor data 128 includes the universal number 520 and sensor frame(s) 602 containing data. Other data such as the hardware ID 402, stream IDs 502, and so forth may also be included. The sensor frames 602 may comprise the data acquired by the sensor 126 during operation, such as an image from a camera 344.

The response module 154 processes the sensor data 128 and determines first sensor data 128(1) and second sensor data 128(2). For example, the response module 154 may use the request identifier module 150 and request ID data 152 to determine information such as the stream IDs 502 and frame IDs 504 associated with particular sensor frames 602, and include that information in the sensor data 128.

In some implementations, the response module 154 may utilize one or more of the data conversion modules 158 to determine one or more of the first sensor data 128(1), the second sensor data 128(2), and so forth. For example, the sensor data 128 may be processed using a hardware scaler to determine the second sensor data 128(2).

The first sensor data 128(1) and the second sensor data 128(2) may be stored in the response queue 156 for access by the first application module 170(1) and the second application module 170(2). Duplicative data, such as the same sensor frame 602 that is associated with the first sensor data 128(1) and the second sensor data 128(2) may not be copied in the response queue 156. Instead, both may refer to the same stored sensor frame 602. This is omitted from this illustration for clarity, and not by way of limitation.

As shown here, the three streams that are supported by the camera 344 in this illustration result in effectively four streams, two to each of the requesting application modules 170. The resulting first sensor data 128(1) and second sensor data 128(2) comports with the parameters 452 associated with the particular device ID 408 and used by the application module 170 that utilizes that particular device ID 408.

The various application modules 170 accessing the sensor arbitrator module 140 may vary over time during operation of the AMD 104. For example, at a given time the first application module 170(1) may be terminated, the second application module 170(2) may continue operating, a third application module 170(3) may be in operation, and so forth. As a result, the application modules 170 and resulting arbitration of parameters 452 is dynamic. Continuing the example, the second application module 170(2) may have a higher priority compared to the third application module 170(3) with respect to the value of the frame rate 456(1). As a result, the application requests 172(2) from the second application module 170(2) would be used to determine the frame rate 456(1) that is specified in a subsequent arbitrated request 180(2).

The sensor arbitrator module 140 may perform other functions as well. In one implementation the sensor arbitrator module 140 may implement a watchdog thread. If the universal number 520 does not increase during a threshold time interval, the watchdog thread may initiate one or more mitigating actions. These mitigating actions may include, but are not limited to, restarting the sensor arbitrator module 140 or modules therein, sending an error message, requesting a restart of one or more application modules 170 that previously requested sensor data 128, and so forth. For example, if the threshold time interval is 5 seconds, if no application requests 172 are received in 5 seconds, the watchdog thread may initiate one or more mitigating actions.

In another implementation the sensor arbitrator module 140 may maintain a count of files currently opened in the operating system module 220 by the sensor arbitrator module 140 or other associated modules. Some operating systems, such as those derived from Linux, may limit a single process to no more than 1024 open files. If the count of files reaches or exceeds a threshold value, the sensor arbitrator module 140 may proceed to close some files. For example, files may be closed on a first-in-first-out (FIFO) basis, with older files closed first.

Figure 7:
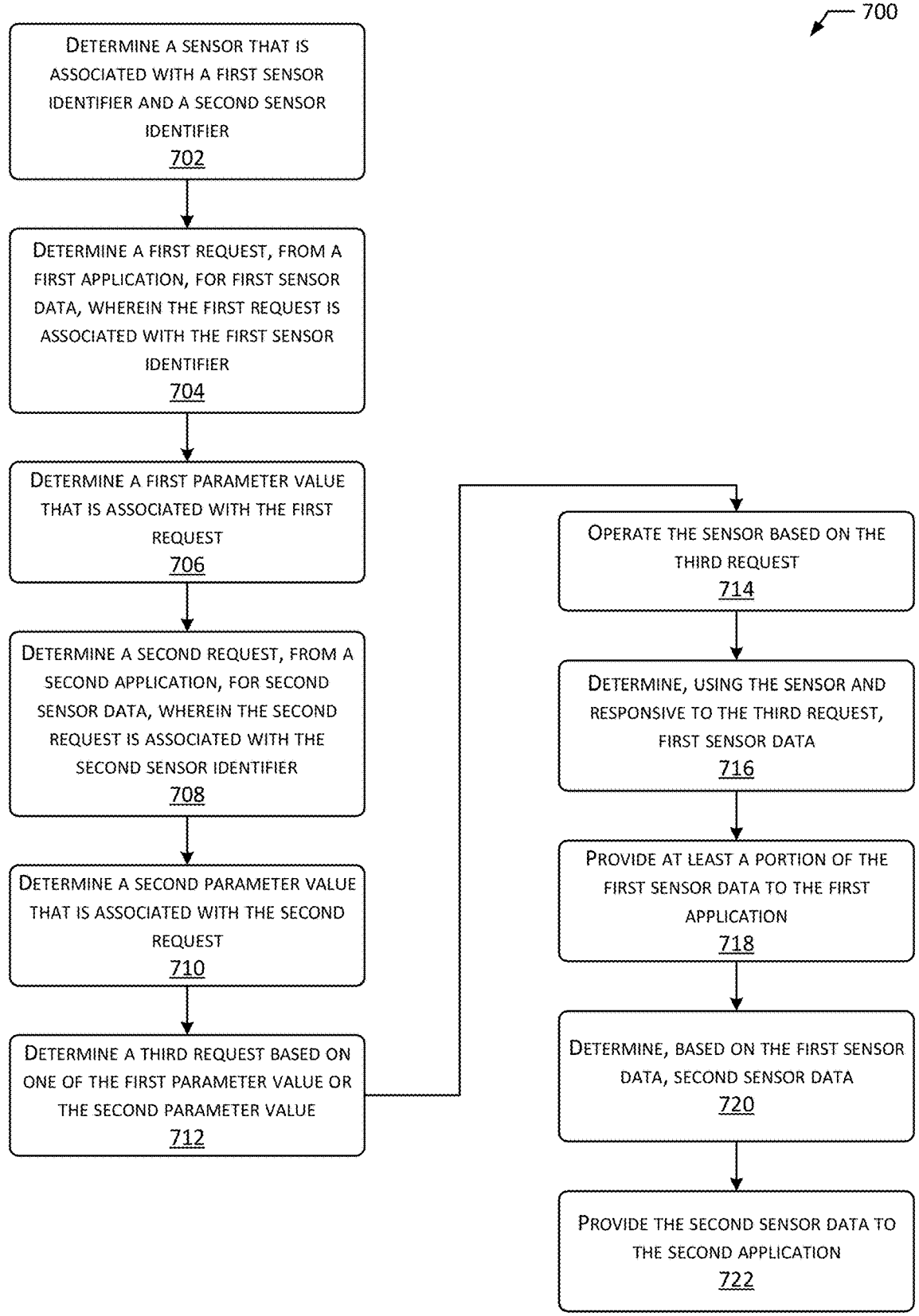
FIG. 7 illustrates a flow diagram of arbitrating concurrent application access, according to some implementations.

FIG. 7 illustrates a flow diagram 700 of arbitrating concurrent application access, according to some implementations. The process may be implemented at least in part by the one or more processors 120 of the AMD 104, the sensors 126, or other components.

At 702 a sensor 126 is associated with a first sensor identifier and a second sensor identifier. For example, the sensor definition data 142 specifies the hardware ID 402 "344(1)" is associated with device IDs 408 "0" and "2".

At 704, a first request, from a first application, for first sensor data 128(1) is determined. For example, the first application module 170(1) may send a first application request 172(1) that is received by the sensor arbitrator module 140. The first request for sensor data 128(1) is associated with the first sensor identifier. For example, the first application request 172(1) may indicate the device ID 408 "0".

At 706, a first parameter value that is associated with the first request is determined. In one implementation, the first application request 172(1) includes one or more parameters 452. In another implementation, the one or more parameters 452 may be retrieved from the arbitration data 144, based on the device ID 408.

At 708, a second request, from a second application, for second sensor data 128(2) is determined. For example, the second application module 170(2) may send a second application request 172(2) that is received by the sensor arbitrator module 140. The second request for sensor data 128(2) is associated with the second sensor identifier. For example, the second application request 172(2) may indicate the device ID 408 "0".

At 710 a second parameter value that is associated with the second request is determined. In one implementation, the second application request 172(2) includes one or more parameters 452. In another implementation, the one or more parameters 452 may be retrieved from the arbitration data 144, based on the device ID 408.

At 712 a third request is determined, based on one or more of the first parameter value or the second parameter value. For example, the request module 146 may determine the arbitrated request 180 based on the first application request 172(1) and the second application request 172(2), as arbitrated based on the arbitration data 144, collated, and so forth.

In some implementations, determination of the third request may be responsive to expiration of the arbitration time window specifying a time interval. For example, if the highest frame rate associated with a participating application module 170 is 30 FPS, the time interval may be less than or equal to $\frac{1}{30}^{th}$ of a second, or 33.3 ms. Continuing the example, the time interval may be 32 ms, providing additional time to complete the determination of the third request and deliver the third request to the sensor HAL 590. Returning to 712, if the first request was not received until after the expiration of the time interval, the third request may comprise the second request. In this way, a delay in sending an application request 172, such as due to a delay in operation of a first application module 170(1), will not adversely affect the prompt delivery of sensor data 128 to a second application module 170(2) that is sharing the same physical sensor 126. The first request, arriving after the expiration of the first time interval, may be used to determine an arbitrated request 180 associated with a second time interval.

At 714 the sensor 126 is operated based on the third request. For example, the arbitrated request 180 may comprise or be based on the first application request 172(1) or such parameters 452 of the first application request 172(1) that have priority over the second application request 172(2). The arbitrated request 180 may comprise a composite of the parameters 452 specified by a highest priority that is specified in the arbitration data 144.

At 716, using the sensor 126 and responsive to the third request, determine first sensor data 128(1). For example, the sensor 126 may send sensor data 128 to the response module 154.

At 718 at least a portion of the first sensor data 128(1) is provided to the first application. The first sensor data 128(1) has the first parameter value and is associated with the first sensor identifier. For example, the response module 154 may determine first sensor data 128(1) that has the resolution specified by the first application request 172(1). This first sensor data 128(1) may be sent to, or accessed by, the first application module 170(1). For example, the first sensor data 128(1) may be stored in the response queue 156.

At 720, based on the first sensor data 128(1), second sensor data 128(2) is determined. The second sensor data 128(2) has the second parameter value and is associated with the second sensor identifier. For example, the second application request 172(2) may have parameters 452 having the same resolution as the first sensor data 128(1), but a lower frame rate. As a result, the second sensor data 128(2) may comprise a subset of the first sensor data 128(1), such as every third frame.

As described above, the request identifier module 150 may be used to provide an application frame ID 504 in the response. In one implementation, a first data identifier is determined that is associated with the first request as received from the first application. A second data identifier is determined that is associated with the second request as received from the second application. The first request used in operating the first sensor is associated with a third data identifier. The first sensor data 128(1) is thus associated with the third data identifier. Based on the third data identifier, the first sensor data 128(1) is indicative of the first data identifier. Based on the third data identifier, the second sensor data 128(2) is indicative of the second data identifier. As a result, the universal number 520 is resolved to the corresponding frame IDs 504 specific to the requesting application module(s) 170.

At 722, the second sensor data 128(2) is provided to the second application. This second sensor data 128(2) may be sent to, or accessed by, the second application module 170(2). For example, the first sensor data 128(1) may be stored in the response queue 156.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

What is claimed is:

1. An autonomous mobile device (AMD) comprising:
a camera;
one or more memories storing computer-executable instructions; and
one or more processors to execute the computer-executable instructions to:
determine a first sensor identifier and a second sensor identifier that are associated with the camera;
determine a first request for image data from a first application, wherein the first request is associated with the first sensor identifier;
determine, based on the first sensor identifier, a first parameter value;
determine a second request for image data from a second application, wherein the second request is associated with the second sensor identifier;
determine, based on the second sensor identifier, a second parameter value;
determine, based on the first sensor identifier and the second sensor identifier, that the first parameter value is prioritized over the second parameter value;

determine a third request for image data based on the first parameter value;
operate the camera based on the third request;
receive, from the camera, first image data responsive to the third request;
provide the first image data to the first application, wherein the first image data has the first parameter value;
determine, based on the first image data, second image data, wherein the second image data has the second parameter value; and
provide the second image data to the second application.

2. The AMD of claim 1, the one or more processors to further execute the computer-executable instructions to:
retrieve, based on the first sensor identifier, a third parameter value;
retrieve, based on the second sensor identifier, a fourth parameter value;
determine that the fourth parameter value is prioritized over the third parameter value; and
wherein the third request is further based on the fourth parameter value.

3. The AMD of claim 2, wherein the first parameter value and the second parameter value are each indicative of one or more of:
frame rate, or
frame resolution; and
wherein the third parameter value and the fourth parameter value are each indicative of one or more of:
camera automatic exposure compensation,
camera automatic exposure mode,
camera control mode,
camera scene mode,
camera exposure time, or
camera sensitivity.

4. A method performed by a device, the method comprising:
determining that a first sensor is associated with a first sensor identifier and a second sensor identifier;
receiving, from a first application a first request, wherein the first request is:
associated with the first sensor identifier, and
associated with a first parameter value of a first parameter;
receiving, from a second application a second request, wherein the second request is:
associated with the second sensor identifier, and
associated with a second parameter value of a second parameter;
determining, based on the first parameter value and the second parameter value, an association between the first request and the second request, wherein the determining the association comprises determining that the first parameter value is evenly divisible by the second parameter value;
responsive to the association between the first request and the second request, operating the first sensor based on the first request;
receiving, from the first sensor, first sensor data responsive to the first request, wherein the first sensor data has the first parameter value;
providing at least a portion of the first sensor data to the first application;
determining, based on the first sensor data, second sensor data, wherein the second sensor data has the second parameter value; and
providing at least a portion of the second sensor data to the second application.

5. The method of claim 4, wherein the first parameter value and the second parameter value are each indicative of one or more of:
frame rate,
sample frequency,
frame resolution, or
sample bit depth.

6. The method of claim 4, wherein:
the first parameter value is indicative of a first frame rate, and
the second parameter value is indicative of a second frame rate; and
the method further comprising:
determining, based on the first frame rate and the second frame rate, a time interval; and
wherein the receiving the first request and the second request occur within the time interval.

7. The method of claim 4, wherein the operating the first sensor comprises using an application programming interface (API) to send the first request to a sensor hardware abstraction layer (HAL).

8. The method of claim 4, further comprising:
determining a first data identifier associated with the first request;
determining a second data identifier associated with the second request; and
associating the first request with a third data identifier;
wherein:
the first sensor data is associated with the third data identifier;
based on the third data identifier, the first sensor data is associated with the first data identifier; and
based on the third data identifier, the second sensor data is associated with the second data identifier.

9. The method of claim 4, further comprising:
determining a first data identifier associated with the first request; and
determining a second data identifier associated with the second request;
wherein the providing the at least a portion of the first sensor data to the first application comprises associating the first sensor data with the first data identifier; and
wherein the providing the at least a portion of the second sensor data to the second application comprises associating the second sensor data with the second data identifier.

10. The method of claim 4, wherein the determining the second sensor data comprises one or more of:
resampling the first sensor data,
transcoding the first sensor data, or
determining a subset of the first sensor data.

11. The method of claim 4, wherein:
the first request comprises a third parameter value of a third parameter; and
the second request comprises a fourth parameter value of a fourth parameter; and
the method further comprising:
determining that the fourth parameter has a higher priority than the third parameter; and
operating the first sensor based on the first parameter value and the fourth parameter value.

12. The method of claim 4, further comprising:
retrieving, based on the first sensor identifier, a third parameter value of a third parameter that is associated with the first request;

retrieving, based on the second sensor identifier, a fourth parameter value of a fourth parameter that is associated with the second request;
determining that the fourth parameter has a higher priority than the third parameter; and
operating the first sensor further based on the fourth parameter value.

13. A computer-implemented method comprising:
determining that a sensor is associated with a first sensor identifier and a second sensor identifier;
determining a first request from a first application, wherein the first request is associated with the first sensor identifier;
determining, based on the first sensor identifier, a first parameter value of a first parameter;
determining a second request from a second application, wherein the second request is associated with the second sensor identifier;
determining, based on the second sensor identifier, a second parameter value of a second parameter;
determining, based on the first sensor identifier and the second sensor identifier, that the first parameter is prioritized over the second parameter;
determining a third request based on the first parameter value;
determining, using the sensor and responsive to the third request, first sensor data;
providing at least a portion of the first sensor data to the first application, wherein the first sensor data has the first parameter value;
determining, based on the first sensor data, second sensor data, wherein the second sensor data has the second parameter value; and
providing at least a portion of the second sensor data to the second application.

14. The method of claim 13, wherein:
the first parameter is indicative of a first frame rate, and the second parameter is indicative of a second frame rate; and
the method further comprising:
determining, based on the first frame rate and the second frame rate, a time interval;
further wherein:
the determining the first request comprises receiving the first request within the time interval; and
the determining the second request comprises receiving the second request within the time interval; and
responsive to determining expiration of the time interval, operating the sensor using the third request.

15. The method of claim 13, further comprising:
determining a first data identifier associated with the first request;
determining a second data identifier associated with the second request; and
associating the third request with a third data identifier;

wherein:
the first sensor data is associated with the third data identifier;
based on the third data identifier, the first sensor data is associated with the first data identifier; and
based on the third data identifier, the second sensor data is associated with the second data identifier.

16. The method of claim 13, further comprising:
determining a first data identifier associated with the first request; and
determining a second data identifier associated with the second request;
wherein the providing the at least a portion of the first sensor data to the first application comprises associating the first sensor data with the first data identifier; and
wherein the providing the at least a portion of the second sensor data to the second application comprises associating the second sensor data with the second data identifier.

17. The method of claim 13, wherein:
the first request comprises a third parameter value of a third parameter; and
the second request comprises a fourth parameter value of a fourth parameter; and
the method further comprising:
determining that the fourth parameter is associated with a higher priority than the third parameter; and
operating the sensor based on the first parameter value and the fourth parameter value.

18. The method of claim 17, wherein the third parameter value and the fourth parameter value are each indicative of one or more of:
camera automatic exposure compensation,
camera automatic exposure mode,
camera control mode,
camera scene mode,
camera exposure time, or
camera sensitivity.

19. The method of claim 13, further comprising:
retrieving, based on the first sensor identifier, a third parameter value that is associated with the first request;
retrieving, based on the second sensor identifier, a fourth parameter value that is associated with the second request;
determining that the fourth parameter value has a higher priority than the third parameter value; and
operating the sensor based on the fourth parameter value.

20. The method of claim 12, wherein the third parameter value and the fourth parameter value are each indicative of one or more of:
camera automatic exposure compensation,
camera automatic exposure mode,
camera control mode,
camera scene mode,
camera exposure time, or
camera sensitivity.

* * * * *

UNITED STATES PATENT AND TRADEMARK OFFICE
CERTIFICATE OF CORRECTION

| | | |
|---|---|---|
| PATENT NO. | : 12,073,617 B1 | Page 1 of 1 |
| APPLICATION NO. | : 17/448105 | |
| DATED | : August 27, 2024 | |
| INVENTOR(S) | : Karthick Kumaran Ayyalluseshagiri Viswanathan et al. | |

It is certified that error appears in the above-identified patent and that said Letters Patent is hereby corrected as shown below:

On the Title Page

Item (56) References Cited please add:
--20110166721 Castaneda et al.--

Signed and Sealed this
Eighth Day of October, 2024

Katherine Kelly Vidal
*Director of the United States Patent and Trademark Office*